(12) United States Patent
Mak et al.

(10) Patent No.: US 7,395,053 B1
(45) Date of Patent: Jul. 1, 2008

(54) CELL SITE MAINTENANCE SCHEDULER

(75) Inventors: Tin Yu Mak, Overland Park, KS (US); Xinhua Yu, Overland Park, KS (US); Vincent Perry Watson, Overland Park, KS (US); Dahl Brougham Metters, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 602 days.

(21) Appl. No.: 11/145,435

(22) Filed: Jun. 3, 2005

(51) Int. Cl.
*H04M 3/42* (2006.01)
*G06F 15/16* (2006.01)
*G06F 15/173* (2006.01)

(52) U.S. Cl. ............... 455/414.1; 709/204; 709/223
(58) Field of Classification Search ............ 455/414.1; 707/102, 202
See application file for complete search history.

(56) References Cited

U.S. PATENT DOCUMENTS

| | | | |
|---|---|---|---|
| 5,285,494 A | 2/1994 | Sprecher et al. | |
| 6,389,426 B1 | 5/2002 | Turnbull et al. | |
| 7,085,786 B2 * | 8/2006 | Carlson et al. | 707/204 |
| 2002/0099682 A1 | 7/2002 | Stanton et al. | |

* cited by examiner

*Primary Examiner*—Joseph Feild
*Assistant Examiner*—Kiet Doan

(57) ABSTRACT

A cell site maintenance scheduling and monitoring system is accessible by a maintenance user and a control center user via a public telephone network and via a private computer network. A scheduling database stores event records, wherein each event record includes a switch name, a cell site number, and an event time. An activity processor is coupled to the scheduling database for managing the scheduling database and for generating a web page displaying the event records. An IVR unit is coupled to the activity processor and coupled to the public telephone network for communicating with the maintenance user, wherein the IVR unit is responsive to the maintenance user during respective telephone calls for directing the activity processor to create a new event record and for directing the activity processor to mark existing event records as closed. The IVR unit collects the switch name, the cell site number, and the event time from the maintenance user for creating the new event record. A web server is coupled to the activity processor and the private computer network for serving the web page to the control center user.

18 Claims, 4 Drawing Sheets

CELL SITE MAINTENANCE SCHEDULER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to cell site maintenance in a cellular telephone network, and, more specifically, to a computer-based tool for scheduling and monitoring of cell site maintenance to assist control center technicians in managing operation of the cellular network.

Communications equipment located at cell sites requires periodic maintenance as well as service visits to modify, upgrade, or repair equipment both on a planned and an emergency basis. Depending upon the specific maintenance activity, cell site operation may be disrupted (e.g., equipment power may be turned off or connections brought down).

Cellular network operation is continuously monitored by network managers at a control center. Full or partial outages and certain types of degraded performance conditions of a cell site are detected by the mobile switch connected to a particular cell site. The mobile switch then sends alarm messages to the control center via a private computer network provided for signaling and network control.

Some maintenance activities result in an alarm being sent by an associated switch to the control center. It is useful for the control center technicians to know whether an incoming alarm was precipitated by maintenance activity or whether it was triggered by a real equipment malfunction. Because of the potential disruption of cell site operation, network managers typically impose restrictions on the times and duration for which maintenance activities are allowed. For these and other reasons, the control center typically keeps a maintenance schedule that is required to be used by all field maintenance personnel.

By virtue of the maintenance schedule, the control center can ensure that time restrictions are followed and can distinguish an alarm caused by maintenance activity from one corresponding to an unattended malfunction. It is also useful for control center personnel to be able to determine recent and upcoming service calls to a cell site when an alarm occurs since that information may help identify a cause or help identify a field technician that can best assist in resolving the current issue.

After completion of a service call, a maintenance technician needs to update the schedule to reflect that the maintenance event is closed. In a large cellular network, there may often be several technicians wanting to interact with the control center simultaneously to create or update (i.e., close) maintenance events. Thus, the creation and maintenance of the schedule has been time consuming and inefficient for both the maintenance technicians and the control center. Furthermore, the schedule data has not been easily or widely accessible within the operations of the cellular network.

SUMMARY OF THE INVENTION

The present invention has the advantages of reducing the time and effort required for scheduling and closing of maintenance events while making data more accurate and accessible within the organization managing and servicing a cellular network.

In one aspect of the invention, a cell site maintenance scheduling and monitoring system is accessible by a maintenance user and a control center user via a public telephone network and via a private computer network. A scheduling database stores event records, wherein each event record includes a switch name, a cell site number, and an event time. An activity processor is coupled to the scheduling database for managing the scheduling database and for generating a web page displaying the event records. An intelligent voice response (IVR) unit is coupled to the activity processor and coupled to the public telephone network for communicating with the maintenance user, wherein the IVR unit is responsive to the maintenance user during respective telephone calls for directing the activity processor to create a new event record and for directing the activity processor to mark existing event records as closed. The IVR unit collects the switch name, the cell site number, and the event time from the maintenance user for creating the new event record. A web server is coupled to the activity processor and the private computer network for serving the web page to the control center user.

DETAILED DESCRIPTION OF PREFERRED EMBODIMENTS

Figure 1:
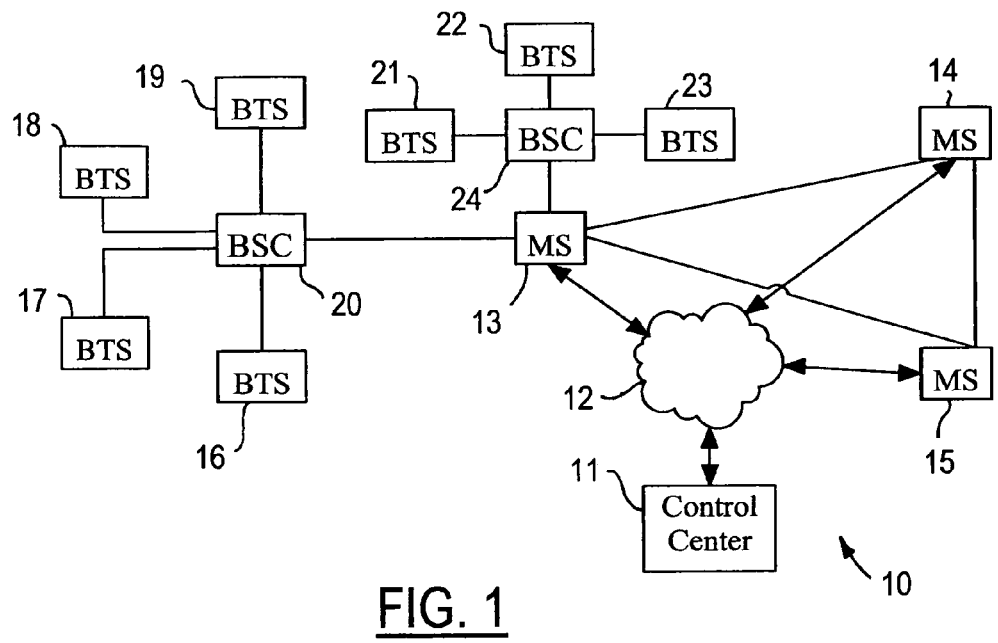
FIG. 1 is a block diagram showing elements of a cellular telephone network.

Referring to FIG. 1, a cellular telephone network 10 includes a control center 11 connected to a private computer network 12 which also connects to a plurality of switches such as a mobile switch 13, mobile switch 14, and mobile switch 15. The mobile switches are connected to each other for carrying cellular user traffic and are also connected to a public switched telephone network via a gateway (not shown). Each mobile switch is connected to a large number of cell sites of which only a small number are shown. Cell sites or base transceiver stations (BTS) 16-19 are connected to a base station controller (BSC) 20. Other cell sites 21-23 are connected to a BSC 24. Operational data collected by each base station controller is forwarded to a respective mobile switch which indicates any failures or alarms associated with the respective cell sites or base station controller. Alarms are forwarded by the mobile switch to control center 11 via the private computer network 12.

Figure 2:
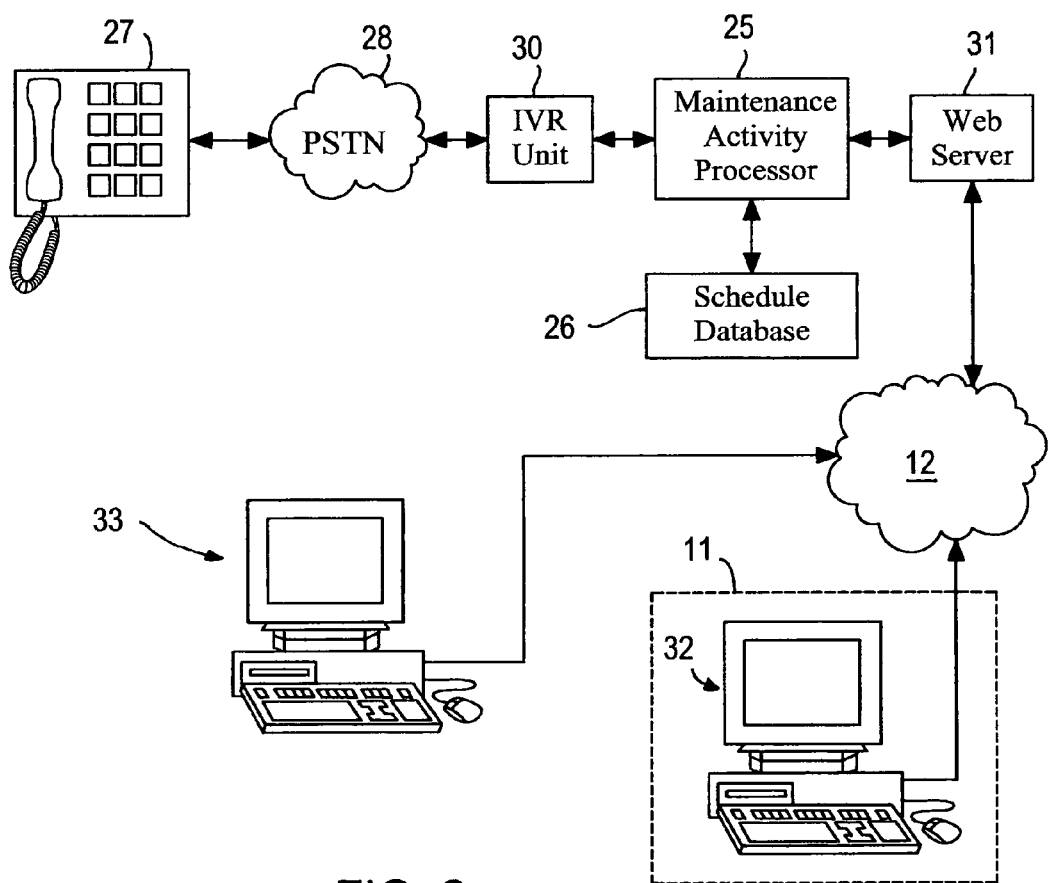
FIG. 2 is a block diagram showing one embodiment of a cell site maintenance scheduling and monitoring system of the present invention.

FIG. 2 shows hardware elements of a scheduling system of the present invention which include a maintenance activity processor 25 connected to a scheduling database 26. A maintenance user desiring to schedule an event may use a telephone 27 coupled to a telephone network 28 (such as the public switched telephone network or the cellular network) for interacting with an intelligent voice response (IVR) unit 30. A technician calls IVR unit 30 using a predetermined telephone number. IVR unit 30 is controlled by a voice XML script (VXML) which causes IVR unit 30 to prompt the maintenance technician for details of the maintenance activity event, such as switch name, cell site number, start date and time, end date and time, whether power alarms will be involved in the planned maintenance, and the technician's telephone number. IVR unit 30 sends the event details to maintenance activity processor 25 which stores the details in database 26. Maintenance activity processor 25 further updates a maintenance activity web page which is provided to a web server 31 connected to private computer network 12. A control center user in control center 11 accesses the web page on web server 31 using a computer 32 coupled to network 12. The web page is also accessible to other users within the cellular network enterprise system via a networked computer 33. The web page on web server 31 preferably also includes a link for allowing all users (e.g., control center users having access to computer 32 and any other enterprise users such as the maintenance user having access to computer 33) to create or update maintenance event records.

Figure 3:
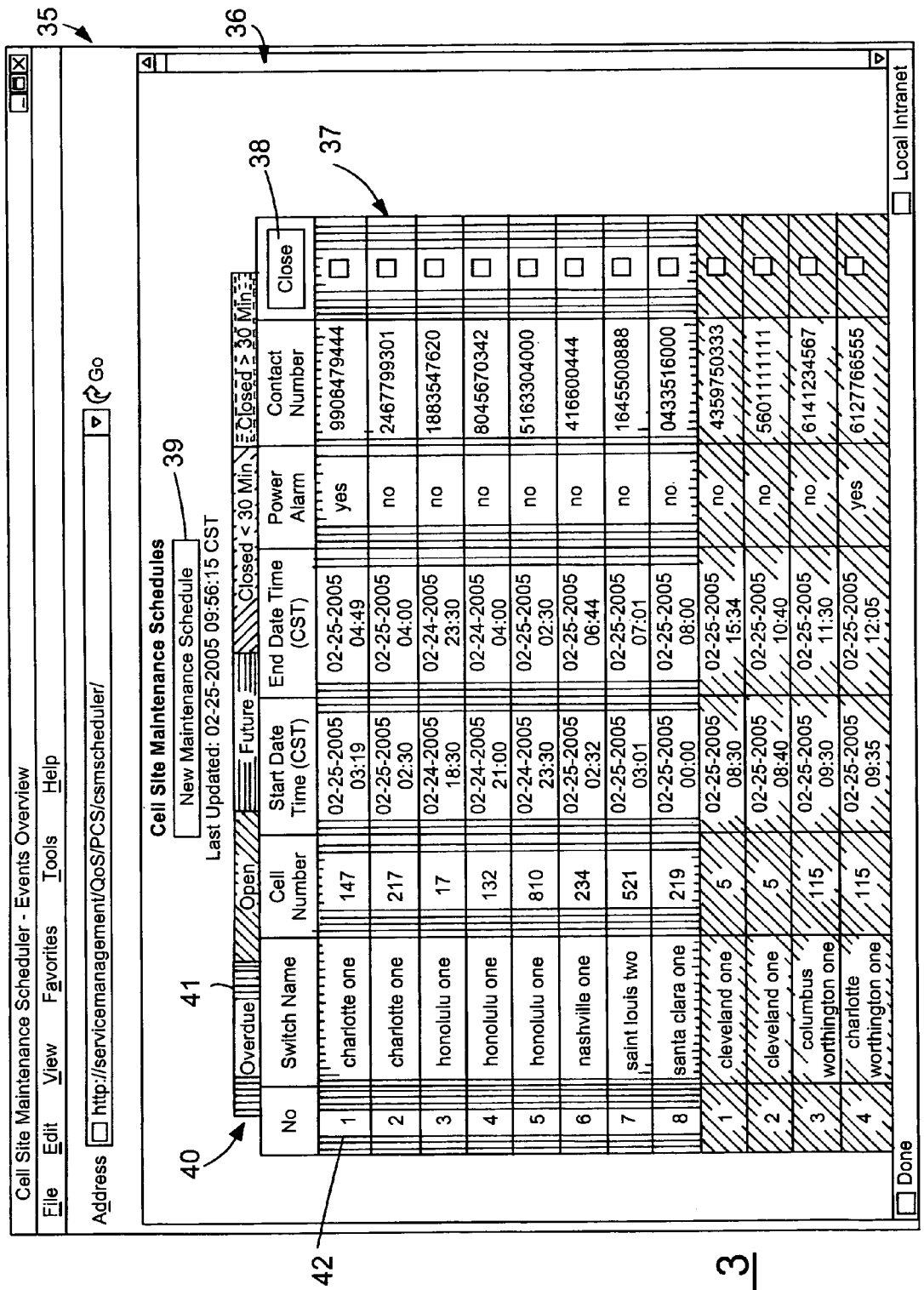
FIG. 3 is a screen shot showing a web page displaying event records.

FIG. 3 shows a screen shot 35 of a browser viewing the maintenance event web page. A browser window 36 shows a listing of maintenance event records in a table 37. Table 37 includes respective columns for listing the contents' of each event record including switch name, cell number, start date and time, end date and time, power alarm, and maintenance person contact telephone number. Table 37 also includes a column of check boxes allowing a person browsing the web page to close an event record by checking a corresponding box using their mouse and then clicking a close button 38. A button 39 is also provided for allowing access to a web page for generating a new maintenance record as will be described in connection with FIG. 5.

Event records in table 37 are sorted according to a plurality of status categories including overdue, open, future, closed for less than 30 minutes, and closed for more than 30 minutes. Within each sorted category, event records are preferably sorted alphabetically by switch name. When a control center user receives an alarm, the name of the switch generating the alarm is provided within the alarm message. The control center user consults table 37 and locates the switch by name very quickly by virtue of the alphabetical lists sorted by status category. A color-coded category bar 40 at the top of table 37 preferably associates predetermined colors with each separately sorted category. Thus, an overdue link 41 in bar 40 utilizes a background color identical to a set of event records 42 sharing the same color. The user can jump directly to a category by selecting a respective colored tab in category bar 40.

Event records are placed into a respective category by the maintenance activity processor which compares the end date and time of non-closed event records with the current time so that event records having an end date and time earlier than the current date and time are placed in the overdue category. Event records for which the current date and time are between the start and end date and time are placed in the open category. Event records having a start date and time later than the current date and time are placed in the future category. Closed event records are sorted into categories for those which have been closed for less than 30 minutes and those closed for more than 30 minutes. The maintenance activity processor may preferably delete event records from the scheduling database that have been closed for more than a predetermined period of time, such as 24 hours.

In operation, the present invention maintains a database of event records for cell site maintenance wherein each event record includes switch name, cell site number, event time, a power alarm flag (e.g., having a value of yes or no indicating whether a power alarm is expected), maintenance user contact phone number, maintenance user name, or other desired information. The information in an event record is provided by the maintenance user during generation of a new event record prior to a service call at the particular cell site. A web page is generated for displaying the event records to control center users or other users within the cellular network enterprise including the maintenance users. When the control center user receives alarm messages from switches in the cellular network indicating malfunctions at a cell site, the control center personnel views the web page in response to the alarm message in order to identify the event record corresponding to the cell site identified in the alarm message. After the maintenance user performs the service visit to a particular cell site, he or she accesses the scheduling database via the maintenance activity processor in order to mark a respective event record as closed.

Creating a new event record or marking an existing record as closed can be performed by the maintenance user (or any other users) either via a voice channel to the IVR unit or a data channel to the web server. Since the maintenance user is most frequently the one to create event records and mark records as closed, and since the maintenance users typically do not have an available computer connection to the private network while at or leaving a cell site, the creation and updating of records will be most often performed using the IVR unit. For either update method, however, no effort is required on the part of control center users in creating or maintaining the maintenance schedule.

Figure 4:
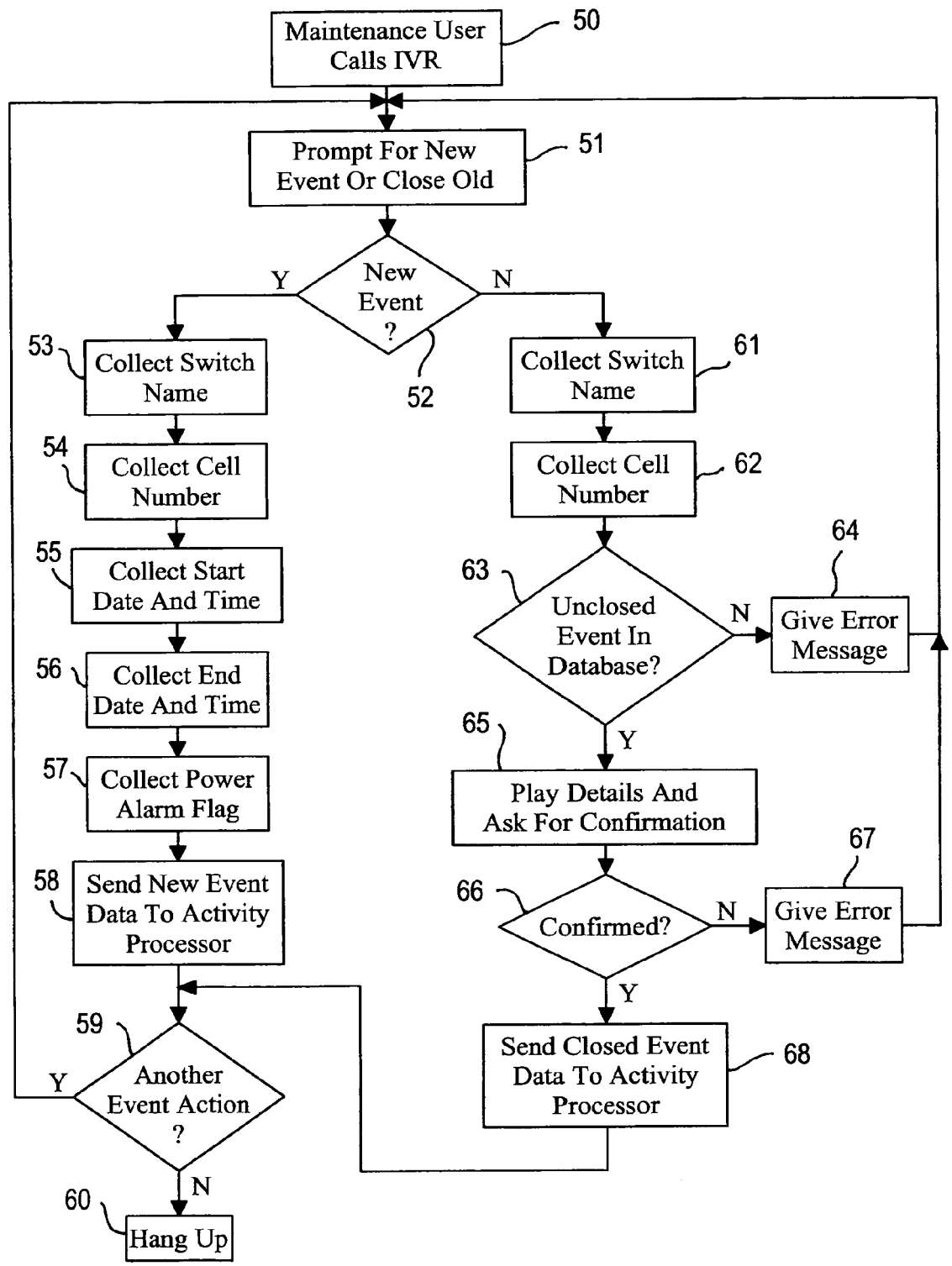
FIG. 4 is a flowchart showing one preferred method for creating and updating event records via an intelligent voice response unit.

FIG. 4 shows a preferred embodiment of a method for a maintenance user to interact with the IVR unit. In step 50, the maintenance user calls the IVR unit using a predetermined telephone number. The telephone call may be initiated using a land line or a wireless cellular terminal. Once the call is established, the IVR unit prompts the maintenance user to identify whether they wish to establish a new event or close an old event in step 51.

The maintenance user speaks a command or presses a touchtone push button on their telephone to specify the new event or closing an old event. The IVR unit checks the response in step 52. If a new event is indicated, than the IVR unit collects the switch name in step 53, the cell number in step 54, the start date and time in step 55, the end date and time in step 56, and the power alarm flag in step 57. The collected information may be indicated by the maintenance user using any combination of speech and button presses as is known in the art. The new event data is sent by the IVR unit to the activity processor in step 58.

After the new event record is created, the IVR unit prompts the user in step 59 to indicate whether another event action is desired. If so, then a return is made to step 51 for determining whether another new event is desired or whether it is desired to mark an old event as closed. If another event is not desired, then the telephone call hangs up in step 60.

If step 52 determines that the user desires to mark an existing event record as closed, then the IVR unit collects the switch name in step 61 and the cell number in step 62. The IVR unit interacts with the maintenance activity processor and the scheduling database in step 63 to determine whether there is an existing unclosed event record in the database corresponding to the collected switch name and cell number. If there is no open event record, then an error message is reproduced by the IVR unit in step 64 and a return is made to step 51. If an unclosed event is found in step 63, then the IVR unit plays the details from the event record (e.g., start and end date and time) in step 65 and prompts the user for confirmation. The user responds either positively or negatively and a check is made in step 66 to determine whether the details are confirmed. If not, then an error message is played in step 67 and a return is made to step 51. If the start and end time details of the unclosed event are confirmed in step 66, then the IVR unit sends the closed event data to the activity processor in step 68 so that the corresponding event record is marked as closed. Thereafter, a check is made in step 59 to determine whether another event action is desired.

Figure 5:
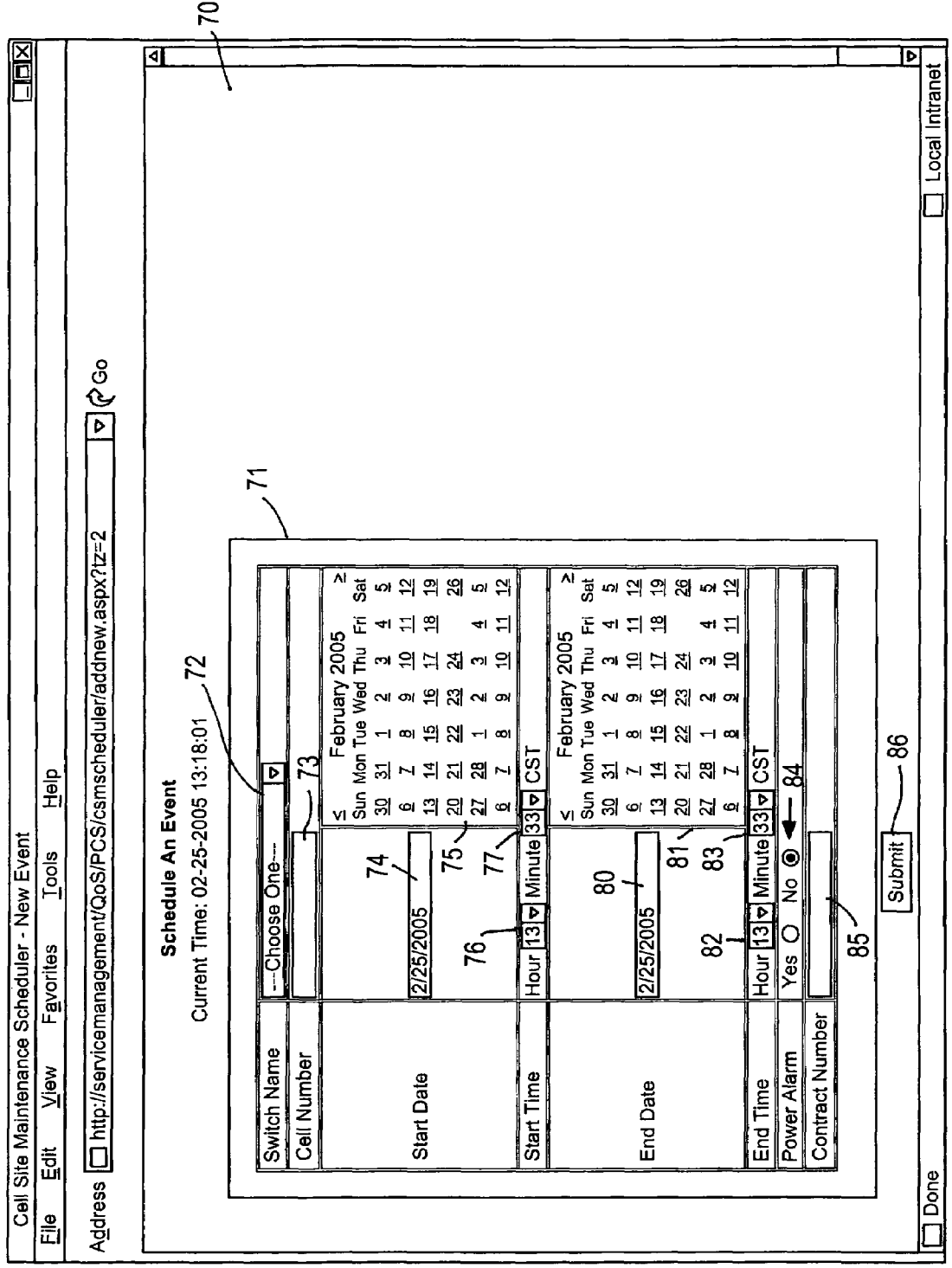
FIG. 5 is a screen shot showing a web page for creating a new event record.

As previously mentioned, the web page displaying event records includes a button or link to allow the browsing user to create a new event record. FIG. 5 is a screen shot showing a web page for entering data for the new event record. A web page 70 includes an input matrix 71 including a pull-down selection box 72 and a cell number text input box 73 for indicating the cell site where the planned service visit will take place. A start date input box 74 is used in conjunction with a clickable calendar 75 for inputting a start date. A start time may be entered using hour and minute pull-down boxes 76 and 77. Likewise, an end date input box 80 and a clickable calendar 81 are used for entering an end date. Pull-down boxes 82 and 83 allow input of the end time hour and minute respectively. Radio buttons 84 are provided for indicating whether a power alarm is expected and a contact number input box 85 is provided for entering the maintenance user's telephone number. Once all the appropriate information is provided, a submit button 86 is activated in order to forward all the information for the new event record to the maintenance activity processor.

What is claimed is:

1. A cell site maintenance scheduling and monitoring system accessible by a maintenance user and a control center user via a public telephone network and via a private computer network comprising:

a scheduling database storing event records and via a private computer network each event record including a switch name, a cell site number, and an event time;

an activity processor coupled to said scheduling database for managing said scheduling database and for generating a web page displaying said event records;

an IVR (Intelligent voice response) unit coupled to said activity processor and coupled to said public telephone network for communicating with said maintenance user, wherein said IVR unit is responsive to said maintenance user during respective telephone calls for directing said activity processor to create a new event record and for directing said activity processor to mark existing event records as closed, said IVR unit collecting said switch name, said cell site number, and said event time from said maintenance user for creating said new event record; and a web server coupled to said activity processor and said private computer network for serving said web page to said control center user.

2. The system of claim 1 wherein said IVR unit collects said switch name and said cell site number when said maintenance user is marking an existing event record as closed.

3. The system of claim 1 wherein said event time comprises a start date, a start time, an end data, and an end time.

4. The system of claim 1 wherein each of said event records further includes a contact telephone number of a respective maintenance user.

5. The system of claim 1 wherein each of said event records further includes a power alarm flag.

6. The system of claim 1 wherein said web page generated by said activity processor displays said event records alphabetically by said switch name.

7. The system of claim 1 wherein said web page generated by said activity processor displays said event records grouped according to a plurality of status categories.

8. The system of claim 7 wherein said status categories include overdue, open, future, and closed.

9. The system of claim 8 wherein said status categories include a first closed category including event records that have been closed for less than a predetermined period of time and a second closed category including event records that have been closed for more than said predetermined period of time.

10. The system of claim 1 wherein said web page includes a link for directing said activity processor to mark selected existing event records as closed.

11. The system of claim 1 wherein said web page includes a link to an event creation page by which a new event record is created.

12. A method of scheduling and monitoring cell site maintenance using a system accessible by a maintenance user and a control center user via a public telephone network and a private computer network, said control center user monitoring a cellular network including a plurality of switches and a plurality of cell sites coupled to said switches, said method comprising the steps of:

maintaining a database of event records for cell site maintenance, each event record including a switch name, a cell site number, and an event time;

said maintenance user generating a respective event record for storing in said database in response to a telephone call to an IVR unit (Intelligent voice response) coupled to said database, said respective event record having a respective switch name, a respective cell site number, and a respective event time corresponding to a planned service visit;

generating a web page for displaying said event records to said control center user;

said control center user receiving alarm messages from said switches indicative of malfunctions at said cell sites;

said control center user viewing said web page in response to an alarm message to identify an event record corresponding to a cell site identified in said alarm message;

said maintenance user performing said service visit; and said maintenance user accessing said database to mark said respective event record as closed.

13. The method of claim 12 wherein said maintenance user establishes a second telephone call to said IVR unit to access said database when marking said respective event record as closed.

14. The method of claim 12 further comprising the step of:

generating a second web page accessible by said maintenance user over said private computer network for generating a further event record corresponding to a further planned service visit at one of said cell sites.

15. The method of claim 12 wherein said step of generating a web page is comprised of:

ordering said event records alphabetically by said switch name.

16. The method of claim 12 wherein said step of generating a web page is comprised of:

grouping said event records according to a plurality of status categories.

17. The method of claim 16 wherein said status categories include overdue, open, future, and closed.

18. The method of claim 16 wherein said step of generating a web page further comprises:

ordering said event records within each category alphabetically by said switch name.

* * * * *